US012647035B2

(12) United States Patent
Arima

(10) Patent No.: US 12,647,035 B2
(45) Date of Patent: Jun. 2, 2026

(54) SEMICONDUCTOR DEVICE FOR SWITCHING POWER SUPPLY AND SWITCHING POWER SUPPLY DEVICE

(71) Applicant: Satoshi Arima, Isehara (JP)

(72) Inventor: Satoshi Arima, Isehara (JP)

(73) Assignee: MITSUMI ELECTRIC CO., LTD., Tokyo (JP)

( * ) Notice: Subject to any disclaimer, the term of this patent is extended or adjusted under 35 U.S.C. 154(b) by 189 days.

(21) Appl. No.: 18/776,306

(22) Filed: Jul. 18, 2024

(65) Prior Publication Data

US 2025/0030348 A1 Jan. 23, 2025

(30) Foreign Application Priority Data

Jul. 19, 2023 (JP) ................................. 2023-117531

(51) Int. Cl.
| | |
|---|---|
| *H02M 3/335* | (2006.01) |
| *H02M 1/00* | (2006.01) |
| *H02M 1/44* | (2007.01) |
| *H02M 3/00* | (2006.01) |

(52) U.S. Cl.
CPC ..... *H02M 3/33507* (2013.01); *H02M 1/0058* (2021.05); *H02M 1/44* (2013.01); *H02M 3/01* (2021.05)

(58) Field of Classification Search
CPC .. H02M 3/33507; H02M 1/0058; H02M 1/44; H02M 3/01; H02M 3/33523; H02M 1/0038; H02M 1/08
See application file for complete search history.

(56) References Cited

U.S. PATENT DOCUMENTS

| | | | | |
|---|---|---|---|---|
| 9,369,049 B2 * | 6/2016 | Xu | ..................... | H02M 3/33523 |
| 9,601,983 B2 * | 3/2017 | Chang | .................... | H02M 1/143 |
| 9,960,690 B2 * | 5/2018 | Matsuda | ................. | H02M 1/08 |
| 10,128,762 B2 * | 11/2018 | Matsuda | ................. | H02M 3/28 |
| 2005/0219776 A1 * | 10/2005 | Yamashita | ........ | H02M 3/33523 |
| | | | | 361/18 |

(Continued)

FOREIGN PATENT DOCUMENTS

| | | |
|---|---|---|
| JP | 2014-124038 A | 7/2014 |
| JP | 2020-58196 A | 4/2020 |
| JP | 2021-103931 A | 7/2021 |

*Primary Examiner* — Yusef A Ahmed
(74) *Attorney, Agent, or Firm* — Shih IP Law Grop, PLLC

(57) ABSTRACT

A semiconductor device for a switching power supply is configured to perform ON/OFF control of a switching element connected in series to a primary winding of a transformer. The semiconductor device includes: a resonance monitor circuit that monitors a resonance state of a secondary winding of the transformer; a timer circuit that generates a period signal for determining a switching period of the switching element; a turn-on circuit that outputs a turn-on signal for the switching element; a turn-off circuit that outputs a turn-off signal for the switching element in response to detecting a current with a predetermined current value flowing through the switching element; and a jitter generation circuit that generates a first jitter signal for giving jitter to a period of the period signal and a second jitter signal for giving jitter to the predetermined current value. The first and second jitter signals have a predetermined phase difference.

5 Claims, 13 Drawing Sheets

(56)          References Cited

U.S. PATENT DOCUMENTS

| | | | | |
|---|---|---|---|---|
| 2005/0259455 A1* | 11/2005 | Mori | H02M 3/33507 | |
| | | | 363/123 | |
| 2007/0121258 A1* | 5/2007 | Hachiya | H02M 3/33507 | |
| | | | 361/18 | |
| 2009/0147547 A1* | 6/2009 | Yamashita | H02M 3/33507 | |
| | | | 363/21.16 | |
| 2011/0096574 A1* | 4/2011 | Huang | H02M 3/33507 | |
| | | | 363/21.18 | |
| 2012/0106208 A1* | 5/2012 | Sugawara | H02M 3/33523 | |
| | | | 363/21.13 | |
| 2012/0250370 A1* | 10/2012 | Taniguchi | H02M 3/33561 | |
| | | | 363/34 | |
| 2013/0134892 A1* | 5/2013 | Kado | H05B 45/14 | |
| | | | 315/206 | |
| 2015/0303898 A1* | 10/2015 | Zhai | H05B 45/345 | |
| | | | 327/109 | |

| | | | |
|---|---|---|---|
| 2016/0261199 A1* | 9/2016 | Adragna | H02M 1/42 |
| 2017/0373604 A1* | 12/2017 | Chen | H02M 1/36 |
| 2018/0034373 A1* | 2/2018 | Matsuda | H02M 1/32 |
| 2018/0191255 A1* | 7/2018 | Mizoe | H02M 1/08 |
| 2019/0074761 A1* | 3/2019 | Matsuda | H02M 1/32 |
| 2019/0334428 A1* | 10/2019 | Arima | H02M 3/33507 |
| 2020/0112256 A1* | 4/2020 | Matsuda | H02M 7/217 |
| 2020/0112264 A1* | 4/2020 | Arima | H02H 7/1213 |
| 2020/0127555 A1* | 4/2020 | Matsuda | H02M 3/33523 |
| 2020/0127571 A1* | 4/2020 | Matsuda | H02M 3/33507 |
| 2021/0199728 A1* | 7/2021 | Arima | G01R 1/20 |
| 2022/0085715 A1* | 3/2022 | Su | H02M 1/083 |
| 2023/0198370 A1* | 6/2023 | Takehana | H02M 1/0058 |
| | | | 363/13 |
| 2024/0305205 A1* | 9/2024 | Yamamoto | H02M 1/44 |
| 2025/0105746 A1* | 3/2025 | Arima | H02M 1/0009 |

* cited by examiner

36

TURN-OFF CIRCUIT (CURRENT DETECTION CIRCUIT)

V$_{FB}$ AGAINST PERIOD OF MINIMUM PERIOD SIGNAL

V$_{FB}$ AGAINST VREF (THRESHOLD FOR VCS)

SEMICONDUCTOR DEVICE FOR SWITCHING POWER SUPPLY AND SWITCHING POWER SUPPLY DEVICE

REFERENCE TO RELATED APPLICATIONS

This application is based upon and claims the benefit of priority from the prior Japanese Patent Application No. 2023-117531, filed on Jul. 19, 2023, the entire content of which is incorporated herein by reference.

TECHNICAL FIELD

The present disclosure relates to a semiconductor device (power supply control IC) for a switching power supply and a switching power supply device. The present disclosure particularly relates to: a power supply control IC that controls a switching element on a primary side of a direct current (DC) power supply device having a transformer for voltage conversion; and a switching power supply device that uses the power supply control IC.

DESCRIPTION OF RELATED ART

An insulated switching power supply device is a type of a DC power supply device and includes: a diode bridge circuit that rectifies an alternating current (AC) power; and a DC-DC convertor that converts, into a desired DC voltage, a DC voltage obtained by the diode bridge circuit rectifying the AC voltage. A known insulated switching power supply device turns on and off a switching element connected in series to a primary winding of a voltage conversion transformer by using the pulse width modulation (PWM) control method, the quasi-resonance control method, or the like. The insulated switching power supply device thus controls a current flowing through the primary winding and thereby controls a voltage induced in the secondary winding.

The PWM control and the quasi-resonance control each have advantages and disadvantages. For example, the PWM control has disadvantages in generating large switching loss and large conduction noise and having a somewhat low power efficiency. The PWM control has advantages in causing small acoustic noise and being able to operate in the continuous current mode to suppress the current peak of the transformer, hence requiring no large transformer. The quasi-resonance control has disadvantages in causing acoustic noise owing to bottom skip and being able to operate only in the discontinuous current mode, hence requiring large components (e.g., a transformer and an output capacitor). The quasi-resonance control has advantages in turning on a switching element at the bottom of a zero current resonance voltage (soft switching, soft turn-on) and generating small switching loss and small conduction noise, hence being power-efficient.

A known isolated switching power supply device employing the quasi-resonance control method is generally configured to operate only under the quasi-resonance control (e.g., JP 2014-124038A).

To take advantage of both the quasi-resonance control and the PWM control, the applicant of this application invented an isolated switching power supply device that switches between the PWM control and the quasi-resonance control depending on the feedback voltage of the voltage output at the secondary side, and the applicant applied for a patent thereof (JP 2020-58196A, JP 2021-103931A).

The invention of JP2021-103931A was made to solve a problem in the invention of JP 2020-58196A. The problem in the invention of JP2020-58196A occurs when the invention is applied to a power supply device configured to switch the output voltage. According to JP2020-58196A, switching the output voltage to a lower output voltage may cause great fluctuations in the switching period and cause greater output voltage ripples and acoustic noise.

SUMMARY OF THE INVENTION

The applicant also developed a method for a switching power supply device to which the invention of JP2021-103931A is applied. According to the method, jitter is applied to a periodic pulse signal that gives the switching period to reduce the peak of the spectrum of conduction noise.

Under the PWM operation, applying jitter to the periodic pulse signal that gives the switching period can sufficiently reduce the peak of the frequency spectrum of conduction noise. However, under the quasi-resonance operation, the switching periods concentrate on specific periods, as shown in FIG. 14A. Thus, it turned out that the developed method cannot effectively decrease the spectral peak of conduction noise or achieves a quite limited peak decrease effect.

The present disclosure has been conceived in view of the above problem. An object of the present disclosure is to allow an insulated switching power supply device configured to switch between the PWM control and the quasi-resonance control in its normal operation to decrease the peak of the frequency spectrum of conduction noise in both the PWM control operation and the quasi-resonance control operation.

Another object of the present disclosure is to provide a semiconductor device for a switching power supply and a switching power supply device that can suppress conduction noise released under both the PWM control and the quasi-resonance control.

To achieve the abovementioned object, according to an aspect of the present invention, there is provided a semiconductor device for a switching power supply, the device being configured to generate a driving signal for performing ON/OFF control of a switching element connected in series to a primary winding of a transformer for voltage conversion, the transformer including a secondary winding and an auxiliary winding, the semiconductor device including: a resonance monitor circuit that monitors a resonance state of the secondary winding of the transformer, based on a voltage of the auxiliary winding; a timer circuit that generates a period signal that determines a switching period of the switching element; a turn-on circuit that outputs a turn-on signal for turning on the switching element, based on the period signal and a signal from the resonance monitor circuit; a turn-off circuit that outputs a turn-off signal for turning off the switching element in response to detecting a current with a predetermined current value flowing through the switching element; and a jitter generation circuit that generates a first jitter signal for giving jitter to a period of the period signal and a second jitter signal for giving jitter to the predetermined current value at which the turn-off circuit outputs the turn-off signal, wherein the first jitter signal and the second jitter signal have a predetermined phase difference.

BRIEF DESCRIPTION OF DRAWINGS

The accompanying drawings are not intended as a definition of the limits of the present disclosure but illustrate embodiments of the disclosure, and together with the general description given above and the detailed description of the embodiments given below, serve to explain the principles of the disclosure, wherein.

DETAILED DESCRIPTION

Hereinafter, a preferred embodiment of the present disclosure is described with reference to the figures. However, the scope of the present invention is not limited to the disclosed embodiment.

Figure 1:
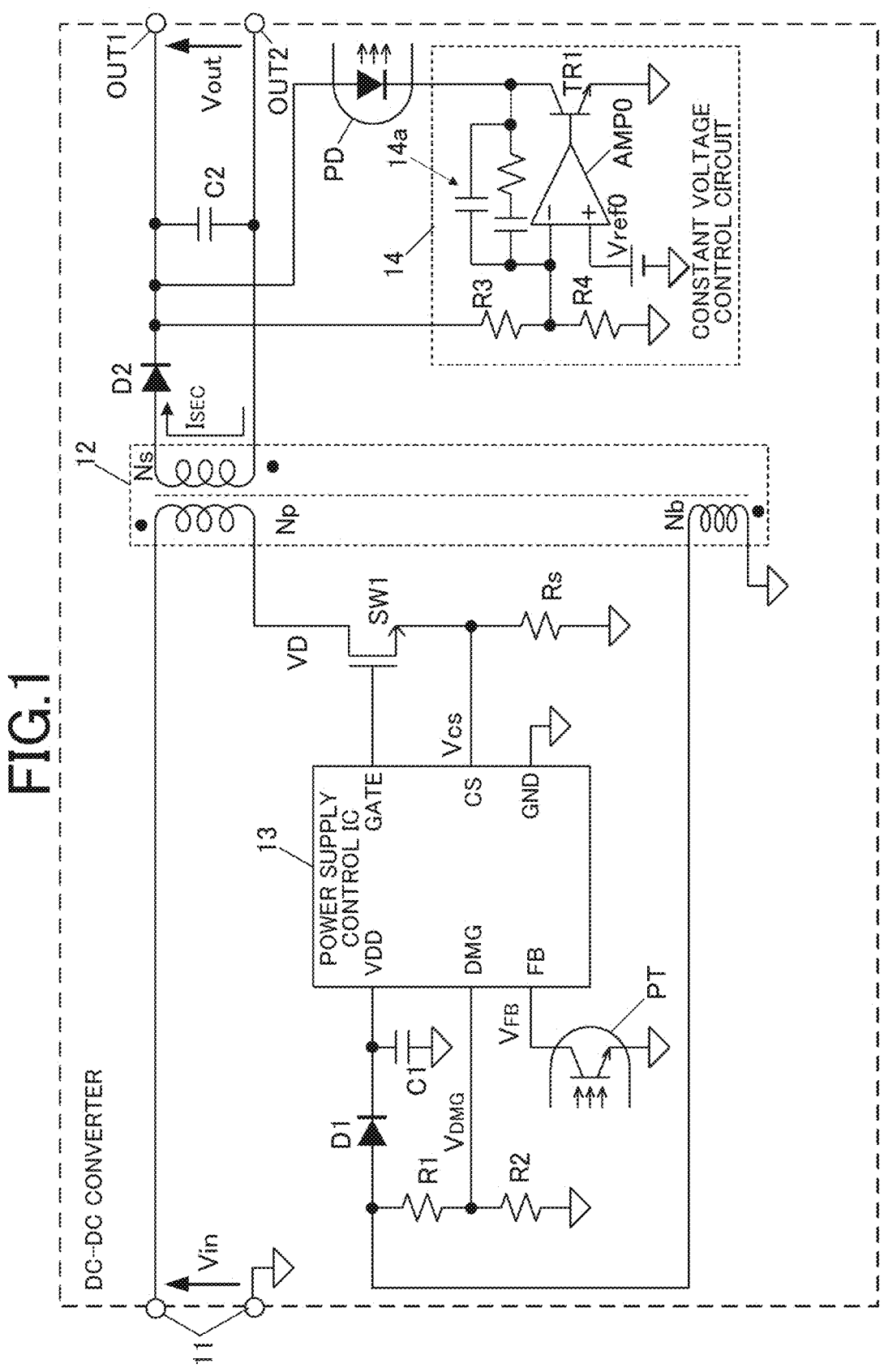
FIG. 1 is a circuit diagram of an embodiment of a DC-DC converter (DC power supply device) to which the semiconductor device for a switching power supply of the present invention is effectively applied.

FIG. 1 is a circuit diagram of an embodiment of an insulated DC-DC converter (DC power supply device) to which the semiconductor device for controlling a power supply (hereinafter called the semiconductor device) is applied.

The insulated DC-DC converter in this embodiment includes a pair of voltage-input terminals 11 to which a direct voltage is input; a transformer 12 for voltage conversion that includes a primary winding Np, a second winding Ns, and an auxiliary winding Nb; a switching transistor SW1 connected in series to the primary winding Np of the transformer 12; and a semiconductor device for a switching power supply (hereinafter called a power supply control IC) 13 configured to turn on and off the switching transistor SW1. To constitute a switching power supply device (AC-DC converter), a diode bridge circuit and a smoothing capacitor are connected in the pre-stage of the input terminals 11 for rectifying AC voltages from an AC power source.

In this embodiment, the switching transistor SW1 is an N-channel MOSFET (insulated-gate field-effect transistor) as a discrete component. The power supply control IC 13 includes an output terminal GATE for outputting a gate drive signal that drives the gate of the transistor SW1.

The DC-DC converter in this embodiment includes a rectification-smoothing circuit in the primary side of the transformer 12. The rectification-smoothing circuit is constituted of a rectifier diode D1 connected in series to the auxiliary winding Nb and a smoothing capacitor C1 connected between the cathode terminal of the rectifier diode D1 and the ground point GND. The voltage rectified and smoothed by the rectification-smoothing circuit is applied to the power-supply voltage terminal VDD of the power supply control IC 13. The power supply control IC 13 includes an external terminal DMG that receives a voltage VDMG into which the voltage induced in the auxiliary winding Nb is divided by resistors R1, R2.

The power supply control IC 13 includes an external terminal FB that is connected to a photo transistor (light receiving element) PT. The photo transistor PT constitutes a photocoupler that transmits an output detection signal at the secondary side as the feedback voltage VFB to the primary side. The power supply control IC 13 includes an external terminal CS as a current detection terminal that receives a voltage VCS into which a current is converted by a resistor Rs connected between the source terminal of the switching transistor SW1 and the GND.

At the secondary side of the transformer 12, the DC-DC converter includes: a rectifier diode D2 connected in series to a terminal of the secondary winding Ns; and a smoothing capacitor C2 connected between the cathode terminal of the rectifier diode D2 and the other terminal of the secondary winding Ns. By intermittently flowing a current through the primary winding Np, an AC voltage is induced in the secondary winding Ns. The rectifier diode D2 and the smoothing capacitor C2 rectify and smooth the voltage induced in the secondary winding Ns to generate and output the DC voltage Vout. The primary winding Np and the secondary winding Ns have reversed polarities and constitute a flyback converter.

At the secondary side of the transformer 12, the DC-DC converter includes: a constant voltage control circuit (shunt regulator) 14 as an output voltage detection circuit that detects the output voltage Vout; and a light-emitting diode (light-emitting element) PD that constitutes the photocoupler for transmitting, to the primary side, an output voltage detection signal corresponding to the voltage detected by the constant voltage control circuit 14.

Through the light-emitting diode PD, current corresponding to the voltage detected by the constant voltage control circuit 14 flows. The light-emitting diode PD transmits a light signal having an intensity corresponding to the detected voltage to the primary side. Through the phototransistor PT, current corresponding to the light intensity flows and is converted to the feedback voltage VFB for input by, for example, a pull-up resistor (Rp in FIG. 2) in the power supply control IC 13.

The constant voltage control circuit 14 includes: a bipolar transistor TR1 connected in series to the light-emitting diode PD; resistors R3, R4 that divide the secondary-side output voltage Vout; an error amplifier AMP0 that compares the divided voltage with a reference voltage Vref0 and outputs a voltage corresponding the potential difference; and a phase compensator circuit 14a. The voltage output by the error amplifier AMP0 is applied to the base terminal of the bipolar transistor TR1, so that a current corresponding to the output voltage Vout flows. In this embodiment, the greater the secondary-side output voltage Vout is, the greater the current flowing through the light-emitting diode PD is, and the greater the current flowing through the phototransistor PT is. As a result, the voltage VFB at the external terminal FB of the power supply control IC 13 decreases.

Although this embodiment includes the rectifier diode D2 at the secondary side, the rectifier diode D2 may be replaced with a switch to perform synchronous rectification.

The functional block configuration and functions of blocks constituting an embodiment of the power supply control IC 13, which is provided at the primary side of the power supply device in FIG. 1, are described with reference to FIG. 2 to FIG. 7.

Figure 2:
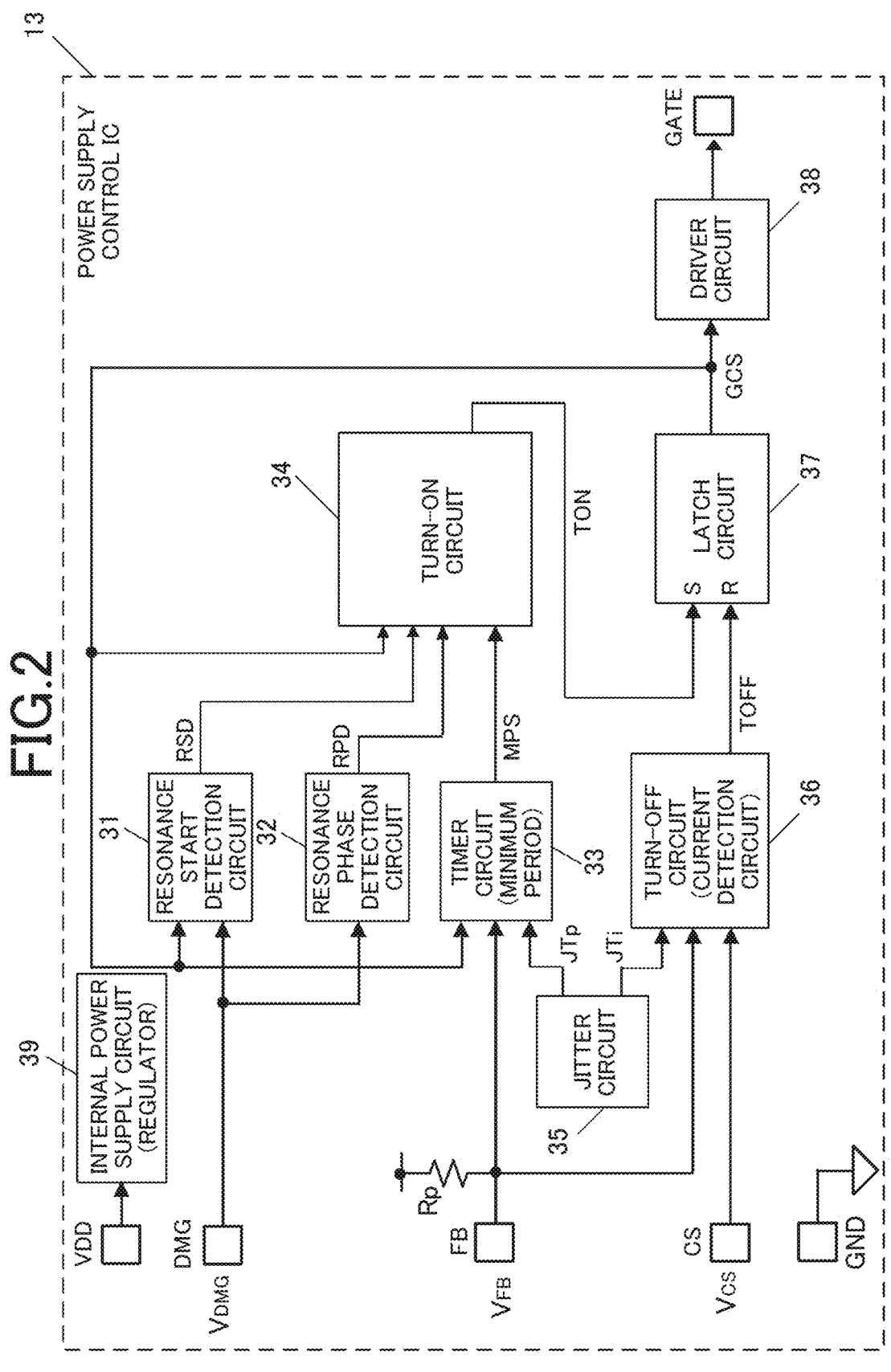
FIG. 2 is a block diagram showing an embodiment of the semiconductor device for a switching power supply according to the present disclosure, the semiconductor device being provided at the primary side of a transformer in the DC-DC converter in FIG. 1.

The power supply control IC 13 in this embodiment is configured to switch between the operation under the quasi-resonance control (hereinafter called the quasi-resonance mode) and the operation under the PWM control (hereinafter called the PWM mode). To perform the switching, the power supply control IC 13 in this embodiment includes a resonance start detection circuit 31 and a resonance phase detection circuit 32, as shown in FIG. 2. The resonance start detection circuit 31 monitors the Voltage VDMG at the external terminal DMG, detects the start of zero current resonance that starts immediately after the current flowing through the secondary winding Ns of the transformer 12 becomes zero, and outputs a resonance start detection signal RSD. The resonance phase detection circuit 32 monitors the voltage VDMG at the external terminal VMG, detects a predetermined phase of the zero current resonance, and outputs a resonance phase detection signal RPD.

The power supply control IC 13 includes a timer circuit 33 that generates a minimum period signal for giving a minimum switching period; and a turn-on circuit 34 that receives signals output by the resonance start detection circuit 31, the resonance phase detection circuit 32, and the timer circuit 33, and generates a turn-on signal TON for turning on the switching transistor SW1.

The timer circuit 33 counts the amount of time corresponding to the voltage VFB at the external terminal FB that receives a feedback signal from the secondary side. To reduce conduction noise released from the power supply under the PWM mode, the power supply control IC 13 includes a jitter circuit 35 that applies jitter to the period of the minimum period signal generated by the timer circuit 33.

The power supply control IC 13 includes a turn-off circuit 36 (current detection circuit) that receives inputs of the voltage VFB at the external terminal FB and the voltage Vcs at the current detection terminal CS and that generates a turn-off signal for turning off the switching transistor SW1. The power supply control IC 13 includes: a latch circuit 37 including an RS flip-flop that receives inputs of the signal TON output by the turn-on circuit 34 and the signal TOFF output by the turn-off circuit 36 and that outputs a gate control signal GCS; and a driver circuit 38 that generates, based on the gate control signal GCS, a gate driving signal for driving the switching transistor SW1 and outputs the gate driving signal from the external terminal GATE.

The gate control signal GCS is supplied to (i) the timer circuit 33 to actuate the timer circuit 33; (ii) the resonance start detection circuit 31 to reset the resonance start detection circuit 31; and (iii) the turn-on circuit 34 to reset the turn-on circuit 34. The power supply control IC 13 includes an internal power supply circuit 39 constituted of a voltage regulator, such as a series regulator that gives an operating voltage to the above-described functional circuits.

The jitter circuit 35 of the power supply control IC 13 in this embodiment is configured to generate a current jitter signal JTi. The current jitter signal JTi changes the voltage input to the turn-off circuit 36 and thereby applies jitter to the peak current of the switching transistor SW1, the peak current being determined by the turn-off signal. The current jitter signal JTi generated by the jitter circuit 35 is input to the turn-off circuit 36.

Hereinafter, detailed examples and operations of the functional blocks 31 to 36 are described.

Figure 3A:
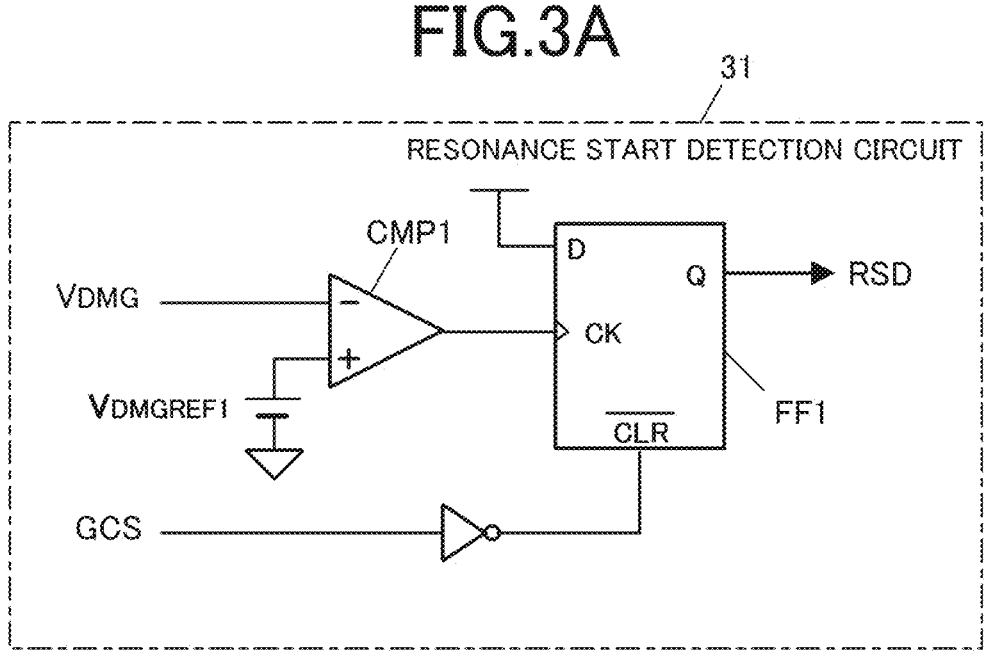
FIG. 3A is a circuit diagram showing a specific example of a resonance start detection circuit that constitutes the semiconductor device in the embodiment.

FIG. 3A shows an example of the resonance start detection circuit 31 among the functional blocks 31 to 36 constituting the power supply control IC 13. As shown in FIG. 3A, the resonance start detection circuit 31 includes: a comparator (voltage comparator circuit) CMP1 that compares the voltage VDMG at the external terminal DMG with a predetermined reference voltage VDMGREF1 and outputs a high-level output when VDMG is less greater than VDMGREF1; and a D-type flip-flop FF1 that latches data "1" according to the output by the comparator CMP1. The output by the D-type flip-flop FF1 is supplied to the turn-on circuit 34 as the resonance start detection signal RSD.

Figure 3B:
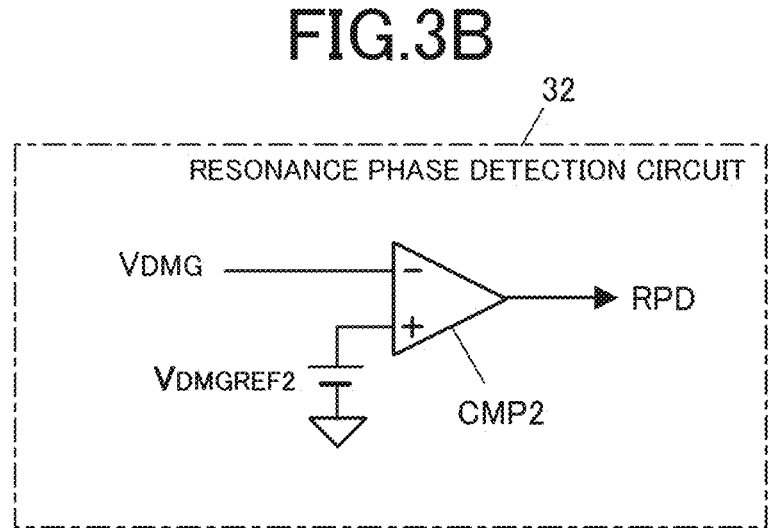
FIG. 3B is a circuit diagram showing a specific example of a resonance phase detection circuit that constitutes the semiconductor device in the embodiment.

On the other hand, the resonance phase detection circuit 32 detects a predetermined phase from the zero-current resonance start point (for example, 180 degrees) and outputs the resonance phase detection signal RPD. Specifically, as shown in FIG. 3B, the resonance phase detection circuit 32 can be constituted of a comparator CMP2 that compares the voltage VDMG at the external terminal DMG with a predetermined reference voltage VDGREF2 and outputs a high-level output when VDMG is lower than the VDMGREF2. Herein, VDMGREF1 and VDMGREF2 are set to satisfy VDMGREF1≥VDMGREF2.

The resonance start detection circuit 31 and the resonance phase detection circuit 32 are provided to detect timing of turning on the switching transistor SW1 in the quasi-resonance mode. Therefore, the resonance start detection circuit 31 and the resonance phase detection circuit 32 may be configured to monitor and detect the drain voltage VD of the switching transistor SW1. The drain voltage VD of the switching transistor SW1, however, may exceed 500V depending on the configuration of the power supply. Even if the drain voltage VD is divided, such a voltage causes a large voltage loss and requires larger components. Further, the voltage at the zero-current resonance start point (timing t2 in FIG. 13) also depends on the input voltage. Therefore, in this embodiment, the voltage in the auxiliary winding Nb of the transformer 12 is divided by the resistors R1, R2, input to the external terminal DMG as the voltage VDMG, and monitored.

Figure 4:
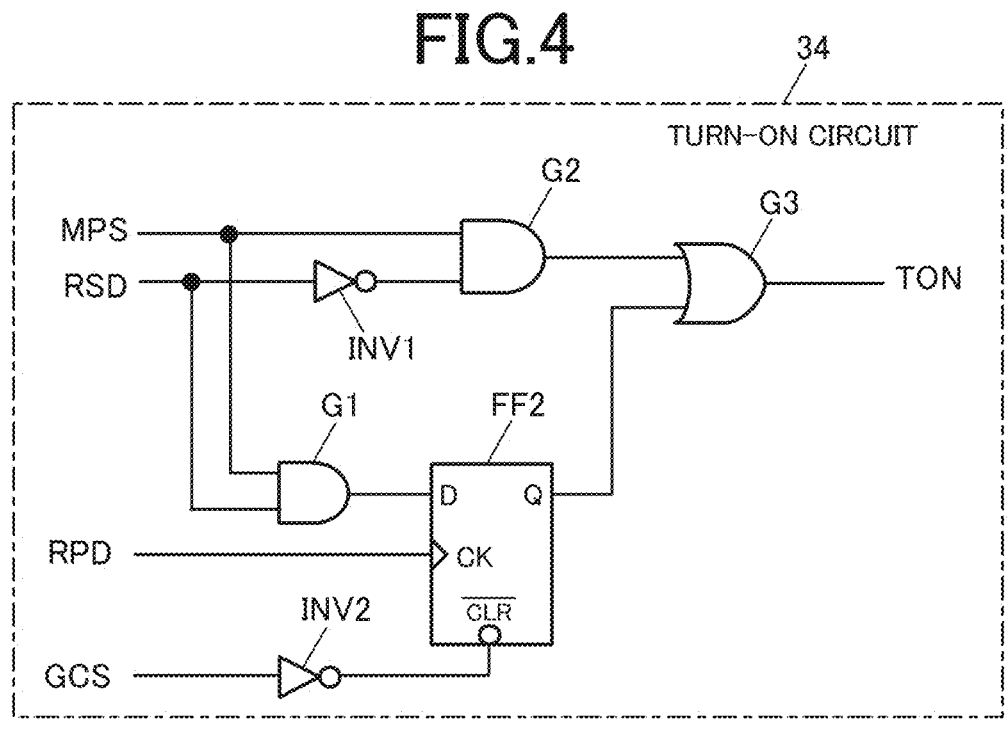
FIG. 4 is a circuit diagram showing a specific example of a turn-on circuit that constitutes the semiconductor device in the embodiment.

As shown in FIG. 4, the turn-on circuit 34 includes: an AND gate G1 that receives input of the minimum period signal MPS from the timer circuit 33 and the resonance start detection signal RSD from the resonance start detection circuit 31; and a D-type flip-flop FF2 that receives, at the data terminal, the output of the AND gate G1. The turn-on circuit 34 further includes: an AND gate G2 that receives input of the minimum period signal MPS from the timer circuit 33 and the inverted signal into which the resonance start detection signal RSD from the resonance start detection circuit 31 is inverted by the inverter INV1; and an OR gate G3 that receives input of the signal output by the AND gate G2 and the signal output by the D-type flip-flop FF2. The OR gate G3 outputs the turn-on signal TON.

The D-type flip-flop FF2 takes in the output of the AND gate G1 in synchronization with the rising of the resonance phase detection signal RPD output by the resonance phase detection circuit 32. The D-type flip-flop FF2 is cleared by the inverted signal into which the gate control signal GCS output by the latch circuit 37 is inverted by the inverter INV2.

Figure 5:
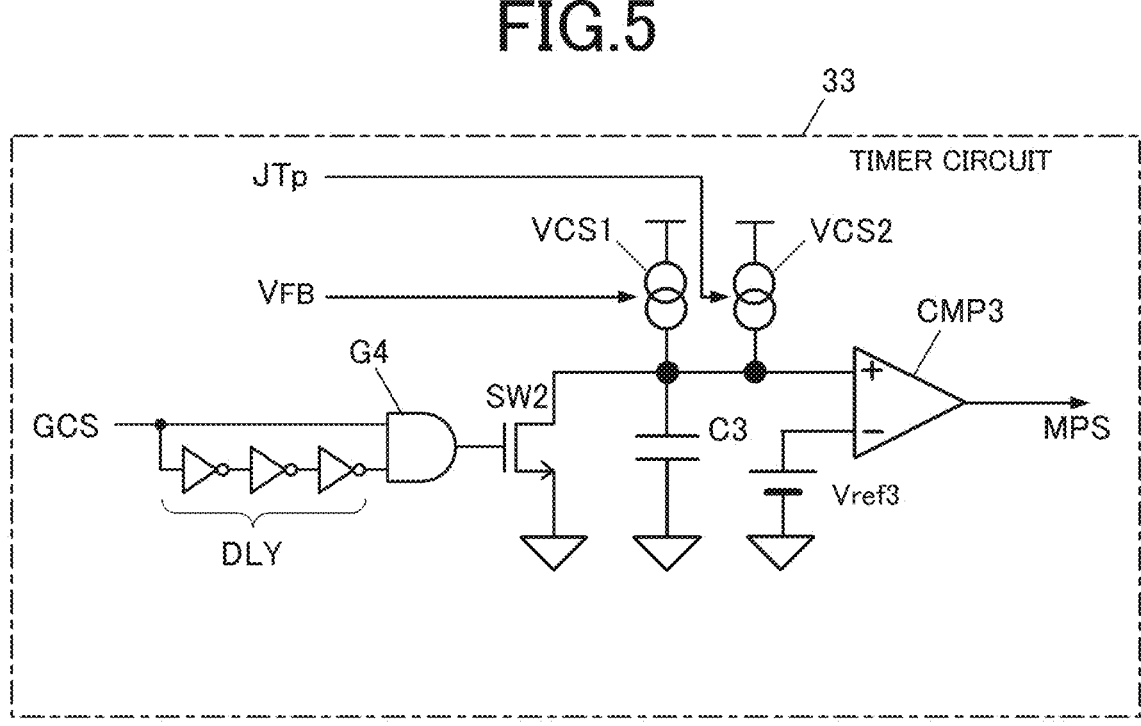
FIG. 5 is a circuit diagram showing a specific example of a minimum period timer circuit that constitutes the semiconductor device in the embodiment.

As shown in FIG. 5, the timer circuit 33 includes an AND gate G4 that receives input of the gate control signal GCS output by the latch circuit 37 and the inverted and delayed signal of the gate control signal GCS inverted and delayed by a delay circuit DLY. The delay circuit DLY is constituted of a series inverter. The timer circuit 33 includes a variable current source VCS1 that flows a current corresponding to the voltage VFB at the external terminal FB, a capacitor C3 that charges with the current from the variable current source VCS1, and a switching transistor SW2 for discharging the capacitor C3. The output of the AND gate G4 is applied to the gate terminal of the switching transistor SW2.

The timer circuit 33 further includes: a comparator CMP3 that compares the voltage of the capacitor C3 and a predetermined reference voltage Vref3; and a second variable current source VCS2 connected in parallel with the variable current source VCS1. The second variable current source VCS2 increases and decreases the amount of current according to the period jitter signal JTp from the jitter circuit 35. The timer circuit 33 may be a digital timer circuit that counts the amount of time with clock signals.

In the timer circuit 33 shown in FIG. 5, when the gate control signal GCS changes from low level to high level, the output of the AND gate G4 changes to high level for a predetermined period of time (delay time by the delay circuit DLY); the switching transistor SW2 is turned on; and the capacitor C3 discharges. When the gate control signal GCS changes to low level and the switching transistor SW2 is turned off, the capacitor C3 starts charging. After a predetermined period of time elapses that is determined by the capacitance value of the capacitor C3 and the current values of the variable current sources VCS1, VCS2, the voltage of the capacitor C3 reaches Vref3 and the output of the comparator CMP3 changes from low level to high level. Accordingly, the timer circuit 33 outputs the minimum period signal MPS that has the period corresponding to the voltage VFB. Jitter is also applied to the period of the minimum period signal MPS, based on the period jitter signal JTp being input.

Figure 8A:
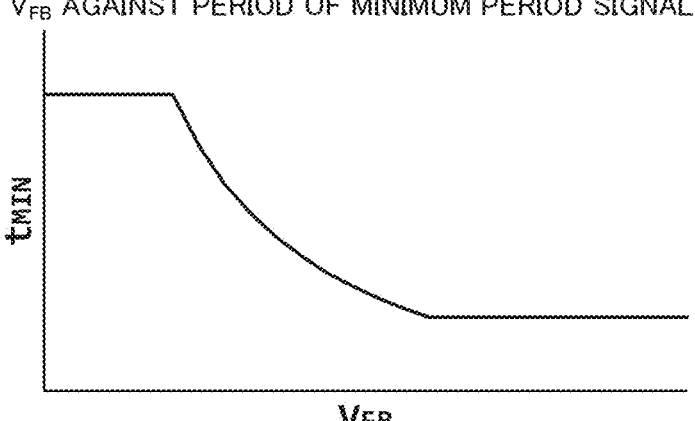
FIG. 8A is a graph showing the relation between the voltage at the FB terminal and the amount of time counted by the minimum period timer circuit in the semiconductor device in this embodiment.

According to the timer circuit 33 in this embodiment, the greater the voltage VFB at the external terminal FB is (the greater the load at the secondary side is), the greater current flows through the variable current source VCS1; the shorter amount of time is counted; and the shorter the period tMIN of the minimum period signal MPS is. FIG. 8A shows an example of how to determine the period tMIN of the minimum period signal MPS and the voltage VFB at the external terminal FB. FIG. 9A shows how the period jitter signal JTp changes the period tMIN of the minimum period signal MPS.

In this embodiment, the period of the minimum period signal MPS is used as the switching period in the PWM mode (continuous current mode) and used as the period of time during which the zero current resonance phase is detected in the quasi-resonance mode (discontinuous current mode). Therefore, the switching period of the switching power supply device employing the power supply control IC 13 in this embodiment is determined based on the period of the minimum period signal MPS output by the timer circuit 33 (the amount of time counted by the timer circuit 33). In the PWM mode, the switching frequency is the inverse of the period of the minimum period signal MPS. In the quasi-resonance mode, the switching frequency is the inverse of (the amount of time counted by the timer circuit 33+the detection delay time until the next rise of the phase detection signal).

Figure 6A:
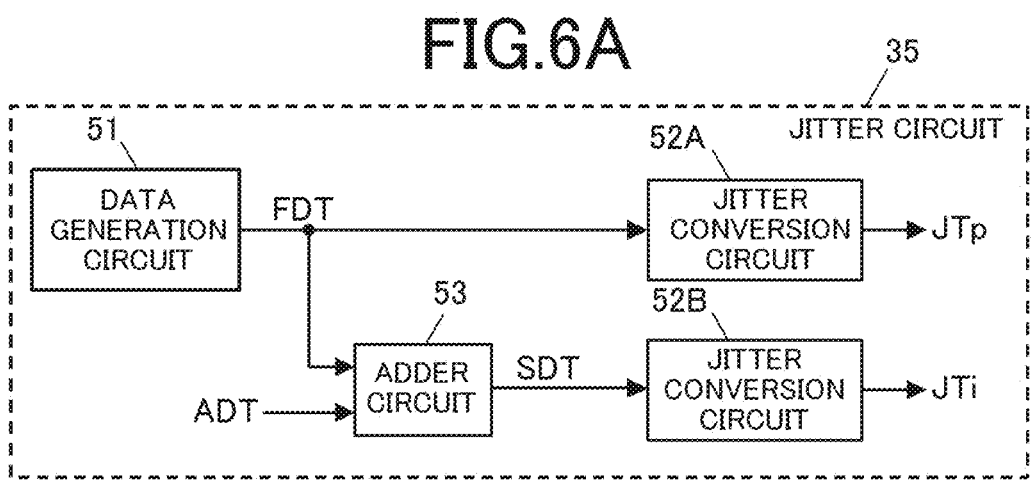
FIG. 6A is a circuit diagram showing a specific example of a jitter circuit that constitutes the semiconductor device in the embodiment.

FIG. 6A shows a detailed example of the circuit configuration of the jitter circuit 35. As shown in FIG. 6A, the jitter circuit 35 includes: a data generation circuit 51 that generates first data FDT; a jitter conversion circuit 52A that generates the period jitter signal JTp based on the first data FDT generated by the data generation circuit 51; an adder circuit 53 that adds a predetermined additional value ADT (fixed value) to the first data FDT to generate second data SDT; and a jitter conversion circuit 52B that generates the current jitter signal JTi based on the second data SDT generated by the adder circuit 53.

Figure 6B:
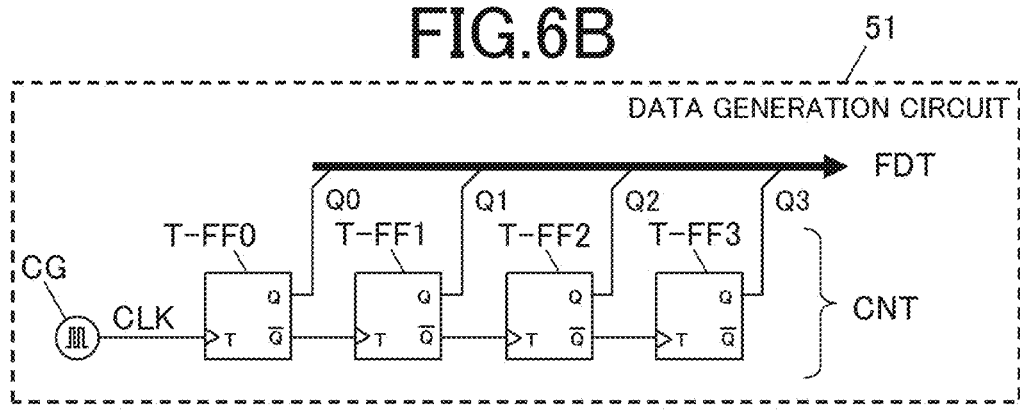
FIG. 6B is a circuit diagram showing a specific example of a data generation circuit that constitutes the jitter circuit.

As shown in FIG. 6B, the data generation circuit 51 includes: a counter circuit CNT constituted of trigger flip-flops T-FF0 to T-FF3 in a cascade connection; and a clock generator CG that generates a clock signal CLK for actuating the counter circuit CNT. The counter circuit CNT counts the amount of time with the clock signal CLK and repeats outputting an increment value (+1). The number of stages constituting the counter circuit CNT is not limited to four as shown in FIG. 6B but may be determined as desired. The period of the clock signal CLK for actuating the counter circuit CNT is determined such that the period of the generated first data FDT is sufficiently longer (a hundred or several hundred times longer) than the switching period of the switching transistor SW1.

Figure 6C:
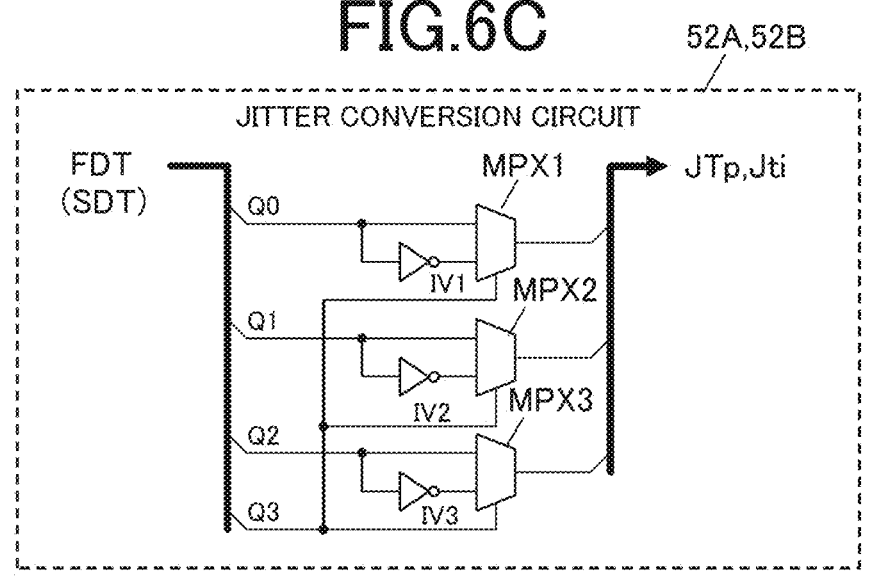
FIG. 6C is a circuit diagram showing a specific example of a jitter conversion circuit that constitutes the jitter circuit.

As shown in FIG. 6C, the jitter conversion circuits 52A, 52B each include: inverters IV1, IV2, IV3 that invert the outputs Q0, Q1, Q2 of the trigger flip-flops T-FF0, T-FF1, T-FF2, respectively; and multiplexers MPX1, MPX2, MPX3 that receive the outputs Q0, Q1, Q2 of the trigger flip-flops T-FF0, T-FF1, T-FF2 and the inversion signals of Q0, Q1, Q2 and that select and output either of the signals. The control terminals of the respective multiplexers MPX1 to MPX3 receive the output Q3 of the flip-flop T-FF3, which is the last stage of the counter circuit CNT.

With such a configuration, when the output Q3 is low-level, the jitter circuits 52A, 52B output increment values (+1) supplied by the counter circuit CNT as they are. When the output Q3 changes to high level, the jitter circuits 52A, 52B convert the data that is supplied by the counter circuit CNT and that consists of increment values (+1) (data in ascending order) into data that consists of decrement values (−1) (data in descending order).

As a result, the outputs of the jitter conversion circuits 52A, 52B can be regarded as data that repeat ups and downs, namely pseudo triangular waveform signals having a specific period. As shown in FIG. 9B, the pseudo triangular waveform signal (JTi) output by the jitter conversion circuit 52B has a phase difference with respect to the pseudo triangular waveform signal (JTp) output by the jitter conversion circuit 52A. The phase difference corresponds to the additional data ADT. Thus, the additional data ADT is regarded as information indicating the amount of phase shift (phase shift signal), and the adder circuit 53 can be regarded as a phase shift circuit.

In this embodiment, the jitter circuit 35 generates the period jitter signal JTp based on the first data FDT and generates the current jitter signal JTi based on the second data SDT that is the total of the first data FDT and the predetermined additional value ADT. However, the period jitter signal JTp and the current jitter signal JTi may be reversed.

Figure 7:
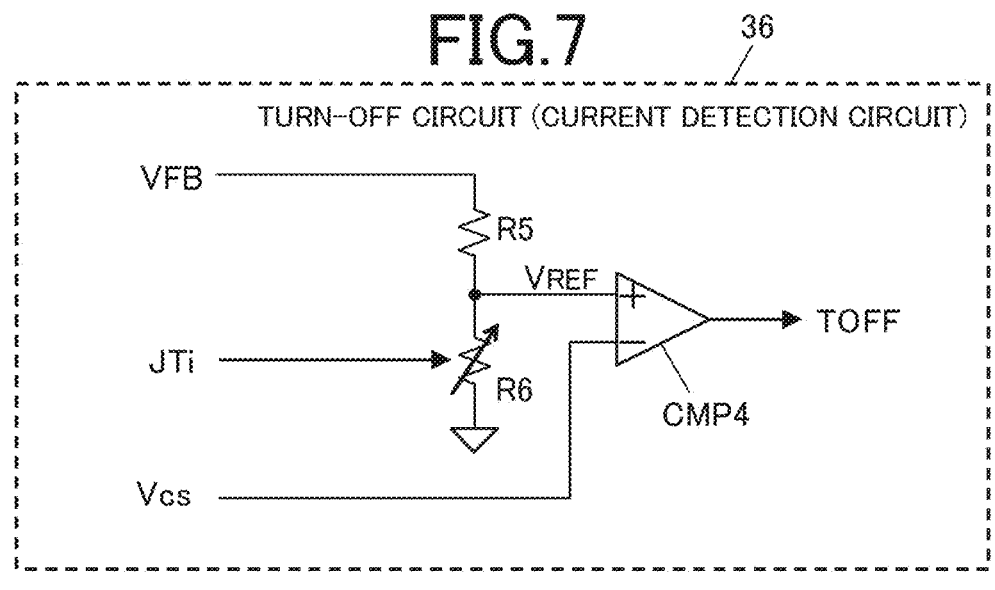
FIG. 7 is a circuit diagram showing a specific example of a turn-off circuit (current detection circuit) that constitutes the semiconductor device in the embodiment.

FIG. 7 shows a detailed example of the circuit configuration of the turn-off circuit 36, which is a current detection circuit. As shown in FIG. 7, the turn-off circuit 36 includes: a voltage divider circuit that consists of a resistor R5 and a variable resistor R6 connected in series between the external terminal FB and the grounding point and that divides the voltage VFB at the terminal FB; and a comparator CMP4 that compares the voltage VCS at the external terminal CS with the threshold voltage VREF into which the voltage VFB is divided by the resistors R5, R6. When the voltage VCS at the external terminal CS exceeds VREF, the output of the comparator CMP4 changes from low level to high level. This output is supplied as the turn-off signal TOFF to the latch circuit 37, so that the switching transistor SW1 is turned off.

In the power supply control IC 13 in this embodiment, the resistance value of the variable resistor R6 of the turn-off circuit 36 changes according to the current jitter signal JTi output by the jitter circuit 35. The change in the resistance value of the variable resistor R6 causes fluctuation in the timing of the turn-off signal TOFF output by the turn-off circuit 36. Thus, jitter is applied to the turn-off signal TOFF for turning off the switching transistor SW1. At the timing the switching transistor SW1 is turned off, the drain current of the switching transistor SW1 reaches a peak current. Thus, applying jitter to the turn-off signal TOFF changes the peak current. That is, the current jitter signal JTi applies jitter to the peak current of the drain current of the switching transistor SW1.

Figure 8B:
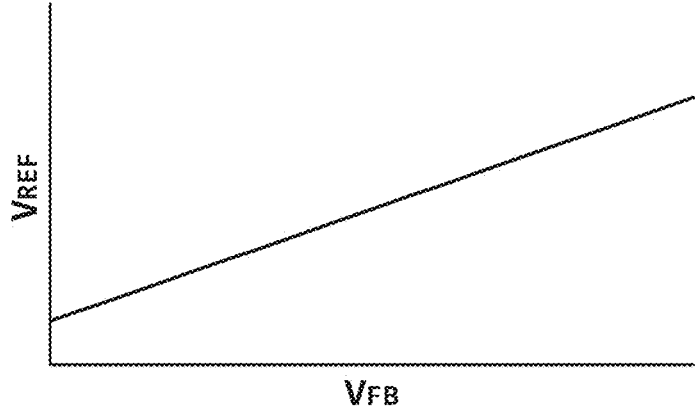
FIG. 8B is a graph showing the relation between the voltage at the FB terminal and a reference voltage as a threshold for VCS of the turn-off circuit (current detection circuit)

FIG. 8B shows an example of how to set the voltage VFB at the terminal FB and the threshold voltage VREF of the comparator CMP3 in the turn-off circuit 36 (current detection circuit). In this embodiment, the resistance value of the variable resistor R6 changes in proportion to the voltage VFB at the terminal FB. Therefore, the threshold voltage VREF changes linearly with respect to the voltage VFB, as shown in FIG. 8B.

Figure 9:
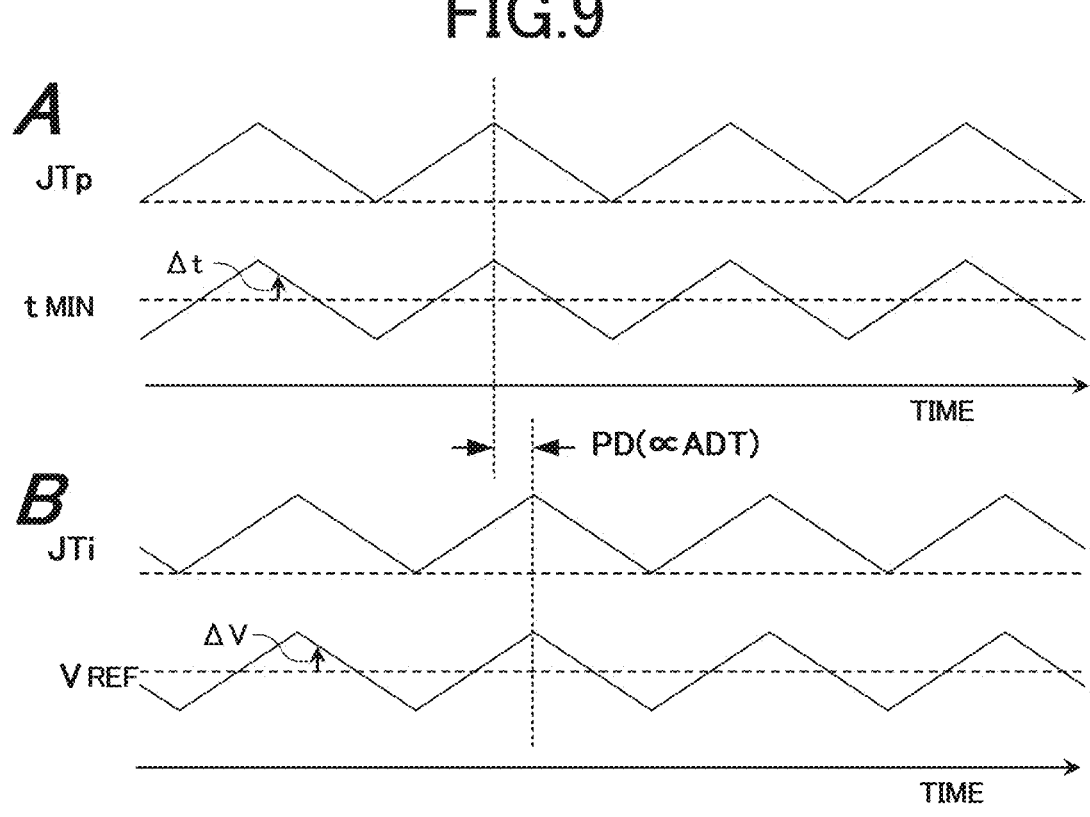
FIG. 9 shows timing charts, wherein the part A is a timing chart showing changes in the period jitter signal and the period of the minimum period signal in the semiconductor device in the embodiment, and the part B is a timing chart showing changes in the current jitter signal and the reference voltage of the tun-off circuit (current detection circuit)

The part B of FIG. 9 shows how the threshold VREF changes according to the current jitter signal JTi. As shown in the part B of FIG. 9, the current jitter signal JTi and the threshold voltage VREF have the same period and the same phase. On the other hand, in comparison of the part A and the part B of FIG. 9, the current jitter signal JTi has a predetermined phase difference PD with respect to the period jitter signal JTp. The phase difference PD is given by the additional data ADT of the adder circuit 52 constituting the jitter circuit 35 shown in FIG. 6. Although not illustrated, when only the period jitter is applied, the change in the period tMIN of the minimum period signal MPS is the same as in the part A of FIG. 9, whereas the threshold voltage VREF is constant and unchanged because the current jitter is not applied.

The characteristics of the operation of the power supply control IC 13 in this embodiment having the above-described configuration are described with reference to FIG. 10 to FIG. 13.

Figure 10:
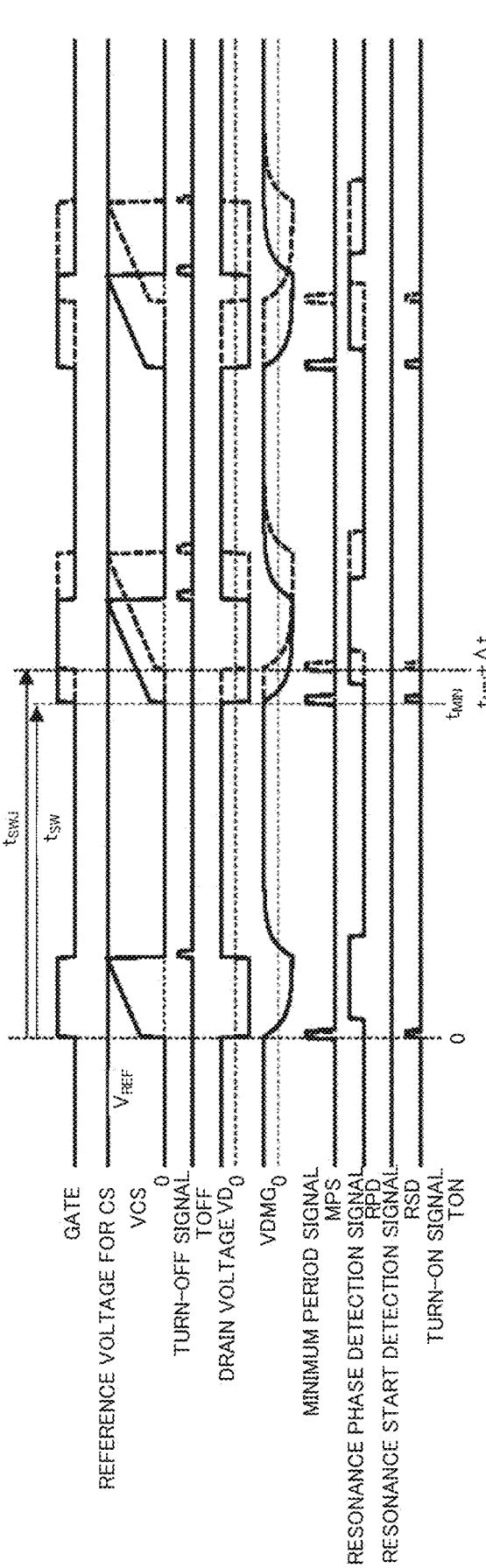
FIG. 10 is a timing chart showing changes in signals at the components when the semiconductor device operates under the PWM mode and the jitter circuit generates only the period jitter signal.
Figure 11:
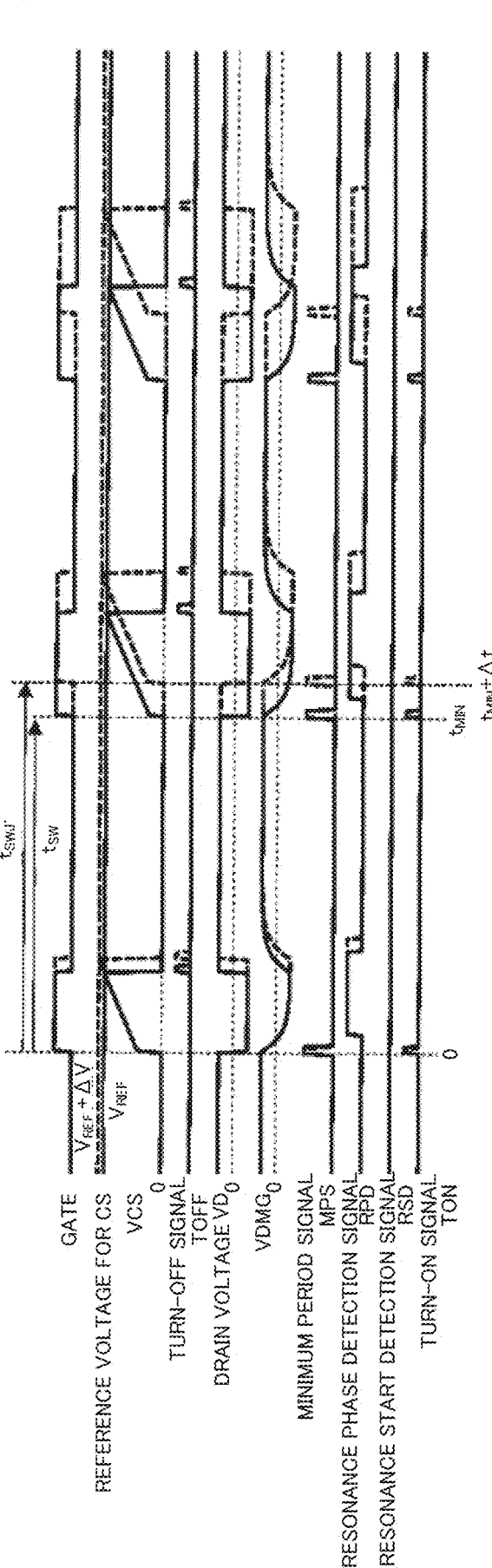
FIG. 11 is a timing chart showing changes in signals at the components when the semiconductor device operates under the PWM mode and the jitter circuit generates the period jitter signal and the current jitter signal.

FIG. 10 shows a timing chart of the power supply control IC 13 in the PWM mode in this embodiment, wherein the jitter circuit 35 generates only the period jitter signal JTp. FIG. 11 shows a timing chart of the power supply control IC 13 in the PWM mode in this embodiment, wherein the jitter circuit 35 generates both the period jitter signal JTp and the current jitter signal JTi.

In FIG. 10 and FIG. 11, tSW is the switching period when neither the period jitter nor the current jitter is applied; tSWJ is the switching period when the current jitter is not applied (only the period jitter is applied) (FIG. 10); tSWJ' is the switching period when both the period jitter and the current jitter are applied (FIG. 11); tMIN is the period of the minimum period signal MPS; and Δt is the amount of change caused by the period jitter.

When neither the period jitter nor the current jitter is applied, tSW=tMIN stands. When only the period jitter is applied, tSWJ=tMIN+Δt stands. when both the period jitter and the current jitter are applied, tSWJ'=tMIN+Δt stands. Thus, in the PWM mode, the switching period can be effectively dispersed by jitter in both cases when only the period jitter is applied and when the period jitter and the current jitter are applied.

Figure 12:
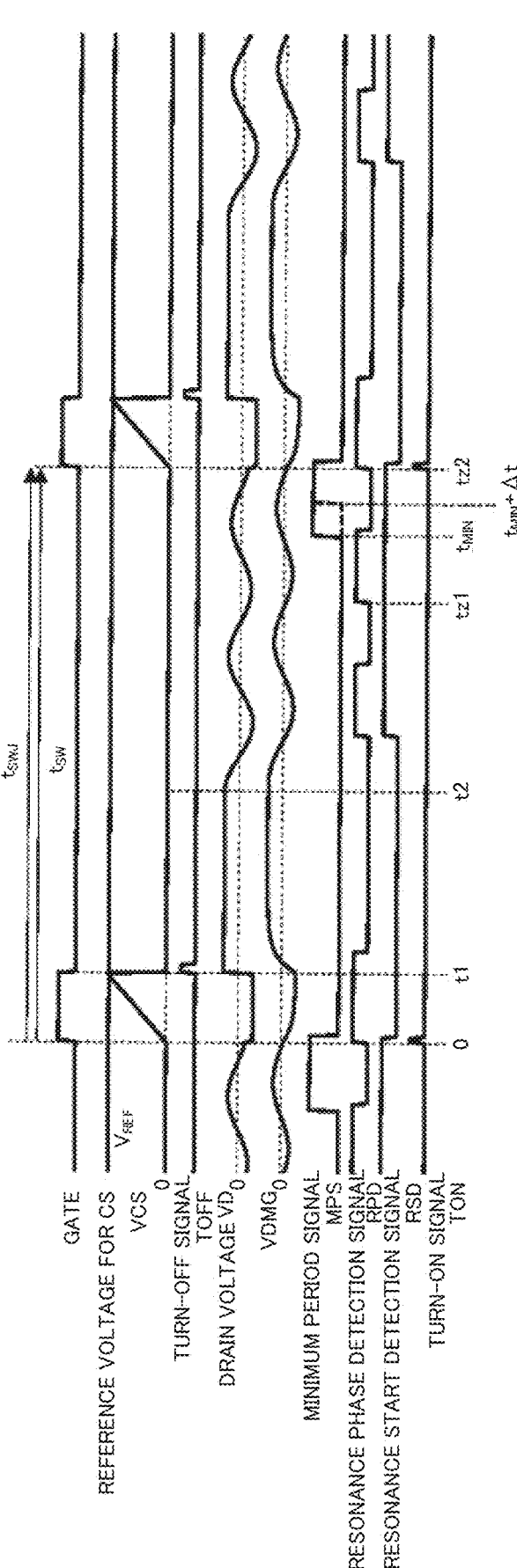
FIG. 12 is a timing chart showing changes in signals at the components when the semiconductor device operates under the quasi-resonance mode and the jitter circuit generates only the period jitter signal.
Figure 13:
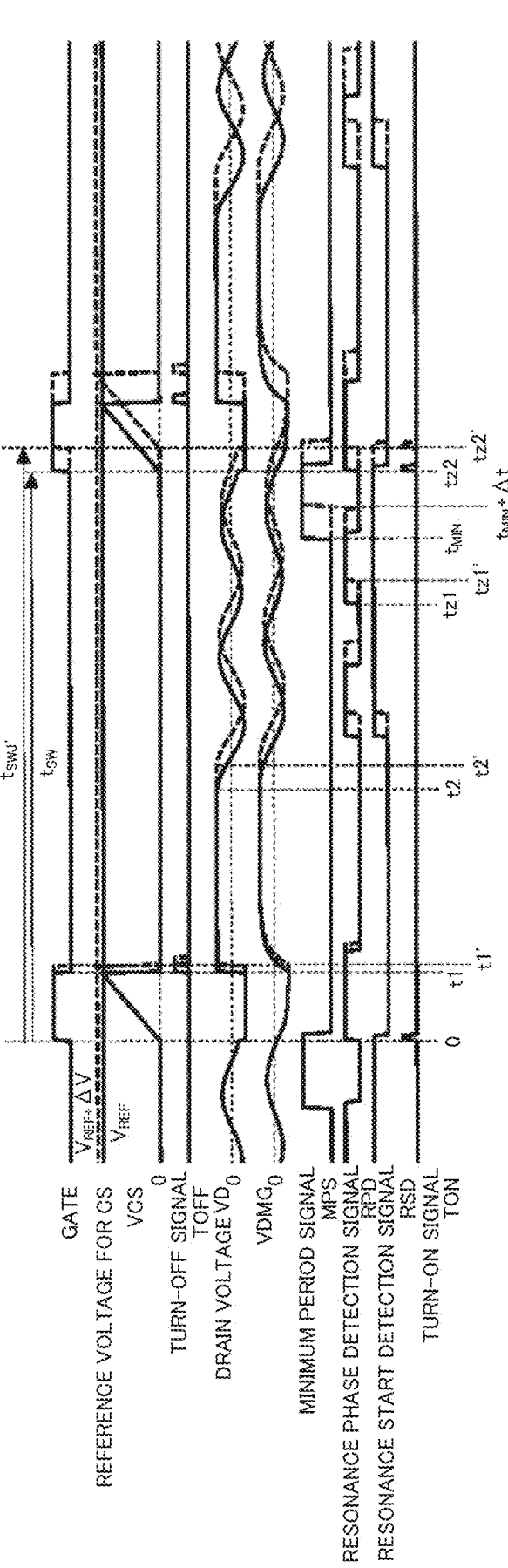
FIG. 13 is a timing chart showing changes in signals at the components when the semiconductor device operates under the quasi-resonance mode and the jitter circuit generates the period jitter signal and the current jitter signal.

FIG. 12 shows a timing chart of the power supply control IC 13 in the quasi-resonance mode in this embodiment, wherein the jitter circuit 35 generates only the period jitter signal JTp. FIG. 13 shows a timing chart of the power supply control IC 13 in the quasi-resonance mode in this embodiment, wherein the jitter circuit 35 generates both the period jitter signal JTp and the current jitter signal JTi.

When only the period jitter is applied in FIG. 12, the switching period tSW is until the phase detection timing tZ2 that comes after the period tMIN of the minimum period signal MPS. Here, zero (0) is the base time at which the switching transistor SW1 is turned on; t2 is the zero current resonance start time; tZP is the zero current resonance period; Δt is the amount added by the period jitter; and tSWJ is the switching period when the period jitter is applied. The periods tSW and tSWJ are expressed by the following expressions. N and NJ are natural numbers, and X is a fixed number (0≤X<1).

$$tSW(N) = t2 + (N + X) * tZP$$

$$tSWJ(NJ) = t2 + (NJ + X) * tZP$$

The relation between tSW and tMIN and the relation between tSWJ and tMIN+Δt are expressed by the following expressions.

$$tSW(N - 1) < tMIN \leq tSW(N)$$

$$tSWJ(NJ - 1) < tMIN + \Delta t \leq tSWJ(NJ)$$

When Δt satisfies the following expression, $$tSW(N - 1) < tMIN + \Delta t \leq tSW(N)$$

the switching period is expressed as follows.

$$tSWJ(NJ) = tSW(N)$$

Thus, the switching period is unchanged no matter whether the period jitter is applied. Thus, when only the period jitter is applied in the quasi-resonance mode, the period jitter cannot effectively disperse the switching period.

FIG. 13 shows the case where the power supply control IC 13 operates in the quasi-resonance mode and the period jitter and the current jitter are applied. VREF is the reference voltage for the turn-off circuit 36 (voltage detection circuit) that detects turn-off timing; ΔV is the amount added by the current jitter; zero (0) is the base time at which the switching transistor SW1 is turned on; t1' is the time at which switching transistor SW1 is turned off; and t2' is the zero current resonance start time. The times t1' and t2' are expressed as follows.

$$t1' = t1 * \left(1 + \Delta V / VREF\right)$$

$$t2' = t2 * \left(1 + \Delta V / VREF\right)$$

The switching period tSW' is determined by the phase detection timing tZ2' that comes after the period tMIN of the minimum period signal MPS.

Here, tSWJ' is the switching period when both the period jitter and the current jitter are applied. The periods tSW and tSWJ' are expressed by the following expressions. N and NJ are natural numbers, and X is a fixed number (0≤X<1).

$$tSW(N) = t2 + (N + X) * tZP$$

$$tSWJ'(NJ') = t2' + (NJ' + X) * tZP$$
$$= t2 * \left(1 + \Delta V / VREF\right) + (NJ' + X) * tZP$$

The difference between the switching periods tSW (without jitter) and tSWJ' (with jitter) is expressed by the following expression.

$$tSWJ'(NJ') - tSW(N) = t2 + (N + X) * Tzp - t2 * \left(1 + \Delta V / VREF\right) + (NJ' + X) * tZP$$
$$= t2 * \Delta V / VREF + (N - NJ') * tZP$$

Thus, even when N=NJ' stands, the switching period changes by t2*ΔV/VREF. Thus, when both the period jitter and the current jitter are applied in the quasi-resonance mode, the switching period can be effectively dispersed.

Figure 14A:
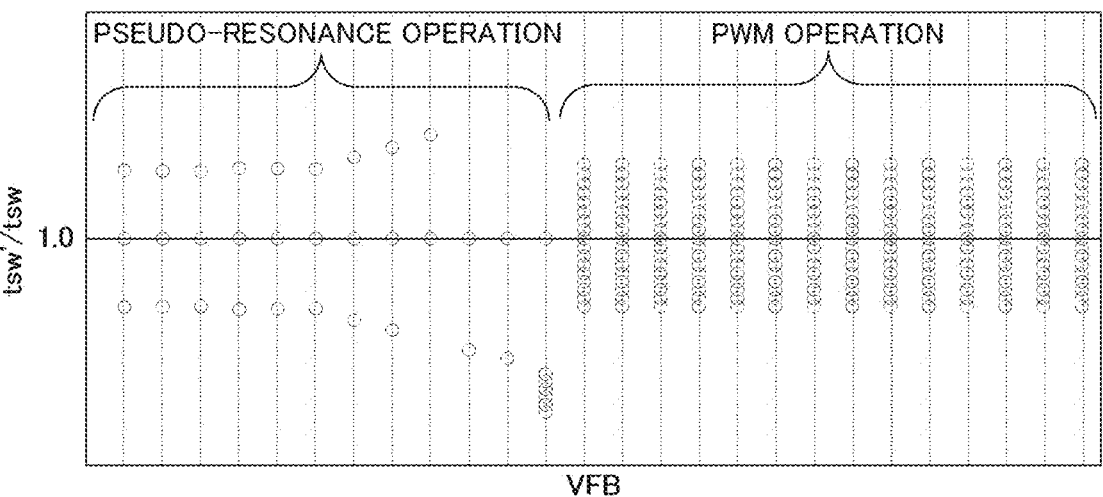
FIG. 14A is a graph showing changes in the switching period of the switching power supply device employing the semiconductor device that applies only the period jitter.
Figure 14B:
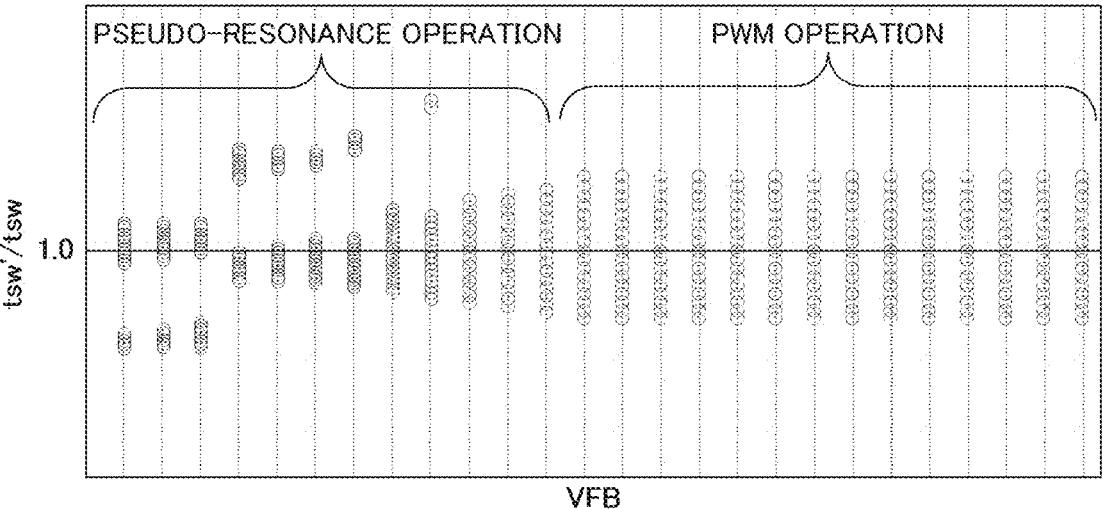
FIG. 14B is a graph showing changes in the switching period of the switching power supply device employing the semiconductor device that applies the period jitter and the current jitter.

FIG. 14A is a graph showing changes in the switching period of the switching power supply device employing the power supply control IC that applies only the period jitter. In FIG. 14A, the horizontal axis shows the feedback voltage VFB, and the vertical axis shows the ratio of the switching period tsw' with jitter to the switching period tsw without jitter. Similarly, FIG. 14B is a graph showing changes in the switching period of the switching power supply device employing the power supply control IC that applies both the period jitter and the current jitter. In FIG. 14B, the horizontal axis shows the feedback voltage VFB, and the vertical axis shows the ratio of the switching period tsw' with jitter to the switching period tsw without jitter.

In comparison of FIG. 14A and FIG. 14B, when only the period jitter is applied in the quasi-resonance operation in FIG. 14A, the switching periods concentrate on three specific discrete periods. This causes the increase of the peak of the frequency spectrum of conduction noise. The switching periods concentrate on specific discrete periods because, in the quasi-resonance operation, the zero current resonance time Tr is expressed as Tr=tZP×(0.5+N), where tZP is the resonance period and N is an integer.

On the other hand, when both the period jitter and the current jitter are applied in the quasi-resonance operation in FIG. 14B, the switching periods concentrate on specific period ranges but are also dispersed around the specific ranges. The switching periods are dispersed in the quasi-resonance operation because the time t2 (FIG. 13) between the turn-on and the start of zero current resonance changes according to the current jitter. As a result, in the quasi-resonance operation, noise is reduced more effectively in FIG. 14B where both the period jitter and the current jitter are applied than in FIG. 14A where only the period jitter is applied.

Figure 15:
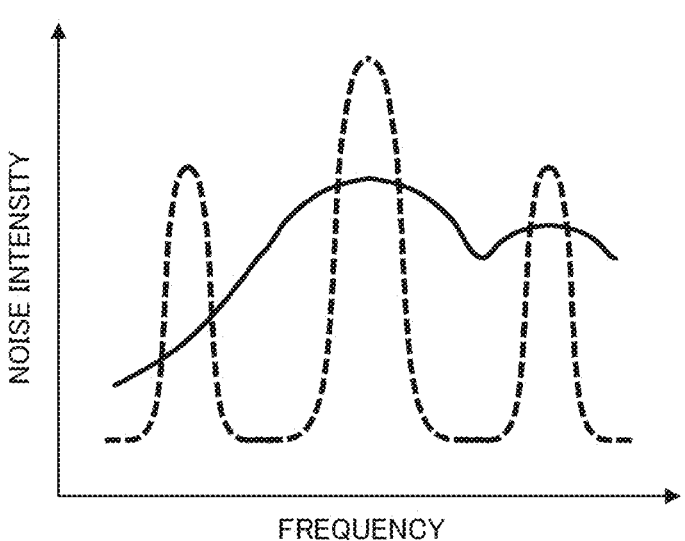
FIG. 15 is a graph in which noise intensity is plotted as the vertical axis and frequency is plotted as the horizontal axis to show spectral distribution of noise in the switching power supply device employing the semiconductor device in the embodiment.

FIG. 15 is a graph in which the horizontal axis shows frequency and the vertical axis shows noise intensity. In FIG. 15, the dashed line shows the frequency spectrum of noise intensity when only the period jitter is applied, and the solid line shows the frequency spectrum of noise intensity when both the period jitter and the current jitter are applied. As shown in FIG. 15, when both the period jitter and the current jitter are applied (solid line), the peak of noise intensity is lower and noise is more effectively reduced than when only the period jitter is applied (dashed line).

Figure 16:
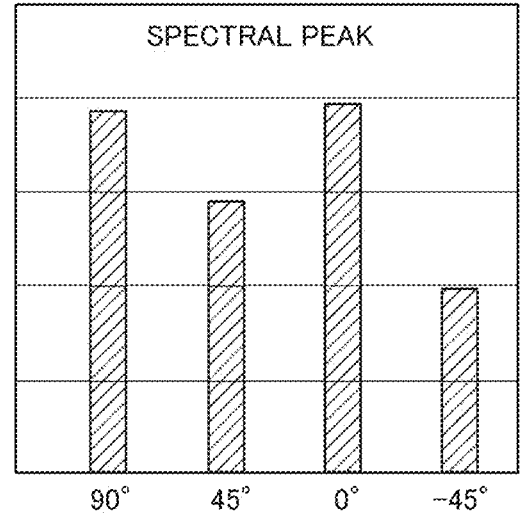
FIG. 16 is a graph showing the relation between the spectral peak and the phase difference between the period jitter and the current jitter of the switching power supply device employing the semiconductor device in the embodiment.

The inventor also found out that, according to the switching power supply device employing the power supply control IC in the embodiment, the spectral peak changes depending on the phase difference between the period jitter and the current jitter, as shown in FIG. 16. In the graph of FIG. 16, the spectral peak is lowest when the phase difference is −45 degrees, as compared with the phase difference of zero (0) degree. The phase difference of −45 degrees is thus expected to disperse the noise spectrum.

However, the relation between the spectral peak the phase difference changes depending on the configuration of the switching power supply device and the amounts of the input voltage, output voltage, and output current. Therefore, to reduce noise, it is most effective to determine the amount of phase shift, based on the conduction noise reduction condition, or more specifically, to determine the amount of phase shift such that the spectral peak is minimized under the condition that bottlenecks the spectral peak of conduction noise. For example, after the condition except the phase difference is determined, find a phase difference that minimizes the spectral peak under the determined condition, and determine the additional data (additional value) in the jitter circuit 35.

As described above, according to the above configuration, the power supply control IC can add jitter to the period signal that gives a minimum switching period and further add jitter to the turn-off timing of the switching element, and thereby reduce the frequency spectrum peak of conduction noise. Thus, the switching power supply device configured to switch between the PWM control and the quasi-resonance control can reduce conduction noise released from the power supply device in both the PWM operation and the quasi-resonance operation.

According to the present disclosure, the insulated switching power supply device configured to switch between the PWM control and the quasi-resonance control in normal operation can reduce the frequency spectrum peak of conduction noise and thereby reduce conduction noise in both the PWM operation and the quasi-resonance operation.

Although the present invention has been described in detail on the basis of the embodiment, the present invention is not limited to the disclosed embodiment. In the above embodiment, the voltage of the auxiliary winding Nb is divided by the resistors R1, R2 that are external elements, and the divided voltage is input to the external terminal DMG. However, the voltage of the auxiliary winding Nb may be directly input to the external terminal DMG, for example. For another example, the voltage may be divided by resistor elements provided inside the power supply control IC or may be divided by a resistor element provide inside the power supply control IC and an external resistor element, and the divided voltage may be input to the external terminal DMG.

In the above embodiment, the switching transistor SW1 and the current sense resistor Rs do not constitute the power supply control IC 13. However, the switching transistor SW1 may be included in the power supply control IC 13 to constitute a semiconductor integrated circuit (the current sense resistor Rs is an external element), or both the switching transistor SW1 and the current sense resistor Rs may be included in the power supply control IC 13. Further, the power supply control IC may be configured to detect the amount of the drain current based on the drain voltage of the internal switching transistor SW1, instead of generating the voltage VCS with the current sense resistor Rs for detection.

Although one or more embodiments of the present disclosure have been described above, the scope of the disclosure is not limited to the embodiments described above but includes the scope of claims below and the scope of their equivalents.

The invention claimed is:

1. A semiconductor device for a switching power supply, the semiconductor device being configured to generate a driving signal for performing ON/OFF control of a switching element connected in series to a primary winding of a transformer for voltage conversion, the transformer including a secondary winding and an auxiliary winding, the semiconductor device comprising:

a resonance monitor circuit that monitors a resonance state of the secondary winding of the transformer, based on a voltage of the auxiliary winding;

a timer circuit that generates a period signal that determines a switching period of the switching element;

a turn-on circuit that outputs a turn-on signal for turning on the switching element, based on the period signal and a signal from the resonance monitor circuit;

a turn-off circuit that outputs a turn-off signal for turning off the switching element in response to detecting a current with a predetermined current value flowing through the switching element; and a jitter generation circuit that generates a first jitter signal for giving jitter to a period of the period signal and a second jitter signal for giving jitter to the predetermined current value at which the turn-off circuit outputs the turn-off signal, wherein the first jitter signal and the second jitter signal have a predetermined phase difference, wherein the jitter generation circuit includes:

a data generation circuit that generates first data from which the first jitter signal is generated, a first jitter signal generation circuit that generates the first jitter signal based on the first data, and a second jitter signal generation circuit that generates the second jitter signal by shifting a phase of the first jitter signal, wherein a period of the first jitter signal and a period of the second jitter signal are longer than the switching period of the switching element, wherein the timer circuit gives jitter to the period of the period signal, based on the first jitter signal output by the first jitter signal generation circuit, and wherein the turn-off circuit gives jitter to the turn-off signal, based on the second jitter signal output by the second jitter signal generation circuit.

2. A switching power supply device comprising:

the semiconductor device according to claim 1;

the transformer that includes the primary winding, the secondary winding, and the auxiliary winding, the primary winding receiving a voltage obtained by rectifying an AC voltage; and the switching element connected to the primary winding, wherein the semiconductor device controls the switching element to output a predetermined voltage to the secondary winding-side.

3. A semiconductor device for a switching power supply, the semiconductor device being configured to generate a driving signal for performing ON/OFF control of a switching element connected in series to a primary winding of a transformer for voltage conversion, the transformer including a secondary winding and an auxiliary winding, the semiconductor device comprising:

a resonance monitor circuit that monitors a resonance state of the secondary winding of the transformer, based on a voltage of the auxiliary winding;

a timer circuit that generates a period signal that determines a switching period of the switching element;

a turn-on circuit that outputs a turn-on signal for turning on the switching element, based on the period signal and a signal from the resonance monitor circuit;

a turn-off circuit that outputs a turn-off signal for turning off the switching element in response to detecting a current with a predetermined current value flowing through the switching element; and a jitter generation circuit that generates a first jitter signal for giving jitter to a period of the period signal and a second jitter signal for giving jitter to the predetermined current value at which the turn-off circuit outputs the turn-off signal, wherein the first jitter signal and the second jitter signal have a predetermined phase difference, wherein the jitter generation circuit includes:

a counter circuit that generates first data from which the first jitter signal is generated, an adder circuit that adds a predetermined additional value to the first data to generate second data from which the second jitter signal is generated, a first data conversion circuit that converts the first data in ascending order into first data in descending order and alternately outputs the first data in ascending order and the first data in descending order, and a second data conversion circuit that converts the second data in ascending order into second data in descending order and alternately outputs the second data in ascending order and the second data in descending order, wherein the timer circuit gives jitter to the period signal, based on the data output by the first data conversion circuit, wherein the turn-off circuit gives jitter to the turn-off signal, based on the data output by the second data conversion circuit, and wherein the predetermined additional value is determined so as to minimize a peak of a frequency spectrum of conduction noise released by a power supply.

4. A semiconductor device for a switching power supply, the semiconductor device being configured to generate a driving signal for performing ON/OFF control of a switching element connected in series to a primary winding of a transformer for voltage conversion, the transformer including a secondary winding and an auxiliary winding, the semiconductor device comprising:

a resonance monitor circuit that monitors a resonance state of the secondary winding of the transformer, based on a voltage of the auxiliary winding;

a timer circuit that generates a period signal that determines a switching period of the switching element;

a turn-on circuit that outputs a turn-on signal for turning on the switching element, based on the period signal and a signal from the resonance monitor circuit;

a turn-off circuit that outputs a turn-off signal for turning off the switching element in response to detecting a current with a predetermined current value flowing through the switching element; and a jitter generation circuit that generates a first jitter signal for giving jitter to a period of the period signal and a second jitter signal for giving jitter to the predetermined current value at which the turn-off circuit outputs the turn-off signal, wherein the first jitter signal and the second jitter signal have a predetermined phase difference, wherein the semiconductor device further comprises a third external terminal that receives a voltage induced in the auxiliary winding or a voltage proportional to the induced voltage, wherein the resonance monitor circuit includes:

a resonance start detection circuit that outputs a resonance start detection signal in response to detecting start of zero current resonance, based on a voltage at the third external terminal, the zero current resonance starting immediately after a current through the secondary winding of the transformer becomes zero after the switching element is turned off, and a resonance phase detection circuit that outputs a resonance phase detection signal in response to detecting a predetermined phase of the zero current resonance, based on the voltage at the third external terminal, wherein, based on the period signal, the resonance start detection signal, and the resonance phase detection signal, the turn-on circuit generates the turn-on signal in response to receiving the period signal before receiving the resonance start detection signal or in response to a rise of the resonance phase detection signal, the rise coming after receipt of the period signal, wherein the semiconductor device further comprises:

a first external terminal that receives a feedback voltage corresponding to a voltage output from a secondary side of the transformer, and a second external terminal that receives a voltage proportional to a current flowing through the switching element, wherein the turn-off circuit detects the current with the predetermined current value flowing through the switching element, based on the feedback voltage at the first external terminal and the voltage at the second external terminal, and wherein the second jitter signal gives jitter to the predetermined current value by changing a voltage derived from the voltage at the second external terminal.

5. The semiconductor device according to claim 4, further comprising a voltage divider circuit that includes a fixed resistor and a variable resistor connected in series between the first external terminal and a reference electric potential point and that divides the feedback voltage at the first external terminal, wherein the turn-off circuit compares a divided voltage generated by the voltage divider circuit and the voltage at the second external terminal and detects the current with the predetermined current value flowing through the switching element, and wherein the second jitter signal gives jitter to the predetermined current value by changing a resistance value of the variable resistor and thereby changing the divided voltage generated by the voltage divider circuit.

* * * * *